United States Patent

[11] 3,612,147

[72] Inventor Morton S. Kaplan
Hibiscus Island, Miami, Fla.
[21] Appl. No. 765,804
[22] Filed Oct. 8, 1968
[45] Patented Oct. 12, 1971
[73] Assignee Waltech Corporation
Miami, Fla.

[54] METHOD OF MAKING WAX CASTINGS
5 Claims, 2 Drawing Figs.

[52] U.S. Cl. ................................................ 164/45,
264/28
[51] Int. Cl. ................................................ B22c 7/02
[50] Field of Search .......................................... 164/9, 34,
45, 246; 264/28, 140; 32/70; 18/30, 30 QM, 30 QT

[56] References Cited
UNITED STATES PATENTS
2,436,993 3/1948 Fisher ............................ 18/30 HQ
2,448,676 9/1948 MacMillan et al. ............. 18/30 HQ X
3,302,257 2/1967 Kaplan ........................... 164/34
2,307,371 1/1943 Hileman .......................... 264/28
3,141,915 7/1964 Nieuwenhuis et al. ......... 164/45 X
3,368,244 2/1968 Mueller .......................... 164/45 X Primary Examiner—J. Spencer Overholser
Assistant Examiner—John E. Roethel ABSTRACT: This disclosure is directed to a process and apparatus for making wax castings for use in the lost wax process of making articles of jewelry. The process involves injection molding a powdered wax which is heated to a temperature under its melting point. The powdered was may be made by grinding prefrozen wax. The apparatus includes an injection ram which is operated under a high-pressure and a slow-ram cycle.

METHOD OF MAKING WAX CASTINGS

BACKGROUND

The making of articles of jewelry, such as rings, may be carried out by the lost wax process. An engraving is made in soft metal, for example, on a pantomill. The metal mold is made in two halves onto which the respective parts of the ring pattern or design is formed. The metal mold may be of the type shown in U.S. Pat. No. 3,302,257. Molten wax is injected in the sprue of the mold and solidifies therein. The metal mold is then opened and the wax ring removed. A number of wax rings are made from the metal mold in this fashion and mounted on a base such as a rubber plate. An investment is formed about the wax rings from a casting plaster material such as crystobalite. The investment is then placed in an oven and heated to a temperature of several hundred degrees to melt the wax and vaporize it. The investment hardens and contains therein cavities in the shape of the desired rings. A metal such as gold or silver is heated until molten and poured into the investment. The investment is then broken open and the rings removed. The rings are finished by polishing and sometimes by setting a gem therein.

In the above process the wax rings are made by placing or clamping the metal mold against the nozzle of a molten wax injector. The injector contains a bath of molten wax and a ram, or other means, to force the wax into the mold. Due to the very fluid condition of the wax only several pounds per square inch pressure is needed during the injection molding. The wax must be rapidly injected into the mold to prevent clogging of the mold due to cooling and solidifying of the wax as it flows through the mold which is much cooler than the wax. The molten wax must be heated to a sufficiently high temperature so that it has a very low viscosity. At this low viscosity the wax quickly flows into the mold and reaches into any intricate channels or engraved portions. A problem is encountered in heating the wax to a uniform temperature since it is a very poor conductor of heat. In a bath of wax having external heating means the wax in the center of the bath is several degrees below the temperature of the wax on the outside edges adjacent the heater. To compensate for this temperature gradient the heater is normally adjusted to several degrees above that necessary for adequate wax fluidity to insure that the wax which is not adjacent the heater is at a high enough temperature. Thus the heating of the wax is a very important parameter in wax-molding operations, however; it leads to a major obstacle in obtaining a wax pattern of fine detail. As the wax cools in the metal mold it shrinks slightly and draws away from the mold surface resulting in a loss of detail and imperfections. Another problem is that the highly fluid wax, when rapidly injected into the mold, has a tendency to trap a small amount of air in the wax and these air pockets lead to further imperfections in the wax patterns.

The present invention is directed to overcoming these difficulties in the prior art by providing an improved method and apparatus for making wax castings for use in the lost wax process.

THE INVENTION

This invention relates to a novel method and means for casting wax patterns for use in the lost wax process.

The improved process comprises forcing a powdered wax under pressure into a mold cavity. The method may include the following steps: prefreezing blocks of wax; grinding the wax to a powder; feeding the powdered wax to an injection chamber which has a nozzle at its lower end and a ram positioned at its upper end; heating the wax in the chamber to soften it; slowly lowering the ram into the chamber to drive the wax into a mold cavity and retaining the ram pressure on the wax for a short period of time.

The improved apparatus of this invention comprises means to slowly drive the powdered wax into a mold cavity under a high pressure and to briefly maintain the pressure. The apparatus may include: a chamber to hold the powdered wax; a nozzle at the lower end of the chamber; an air-driven ram which forces the wax from the chamber, through the nozzle and into a mold cavity; and an adjustable valve control means to actuate the ram and control its cycle.

The invention will be described in greater detail in conjunction with the following figures.

Figure 1:
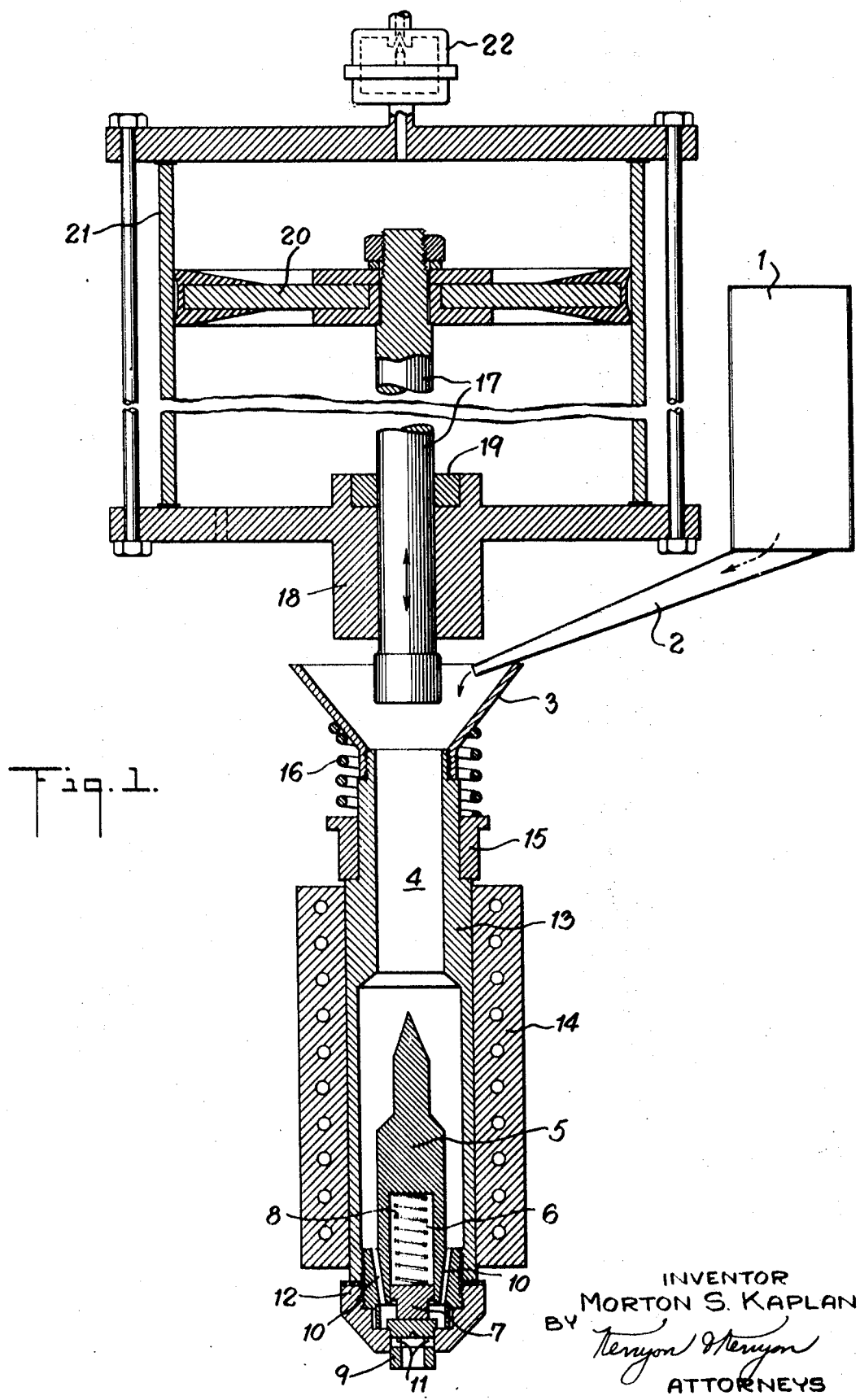
FIG. 1 is a front view of an injection press.

The injection press is shown in FIG. 1 in a position to be loaded with powdered wax. Wax flows from the reservoir 1 down chute 2 and into funnel 3. Flow control means (not shown) may be positioned in the reservoir-chute combination. From the funnel 3 the wax flows in the main wax chamber 4. The valve assembly base and separator member 5 has a chamber 6 with a movable block member 7 and spring 8 therein. The spring biases nozzle valve 9 downward and prevents material in passageways 10 from entering the passageways 11. Nozzle head 12 is attached to the bottom of chamber wall 13, which at its top, is attached to funnel 3. The heating chamber 14 surrounds the chamber wall 13. The heating chamber may comprise an electrical element or heating coil (not shown) connected to thermostatic controls (not shown) for maintaining a predetermined temperature in chamber 4. The funnel 3—chamber wall 13—nozzle 12 combination can move downwardly, since it is an integral unit within heating chamber 14 and bushing 15. The position of these members, as shown, is maintained by the bias of spring 16.

The ram 17 is supported within collar 18 and bushing 19. The upper portion of the ram, its base, is attached to a diaphragm combination 20 within chamber 21. Air enters chamber 21 through adjustable valve 22 to force the ram downward. The lower end of the ram, its head, fits into chamber 4.

Figure 2:
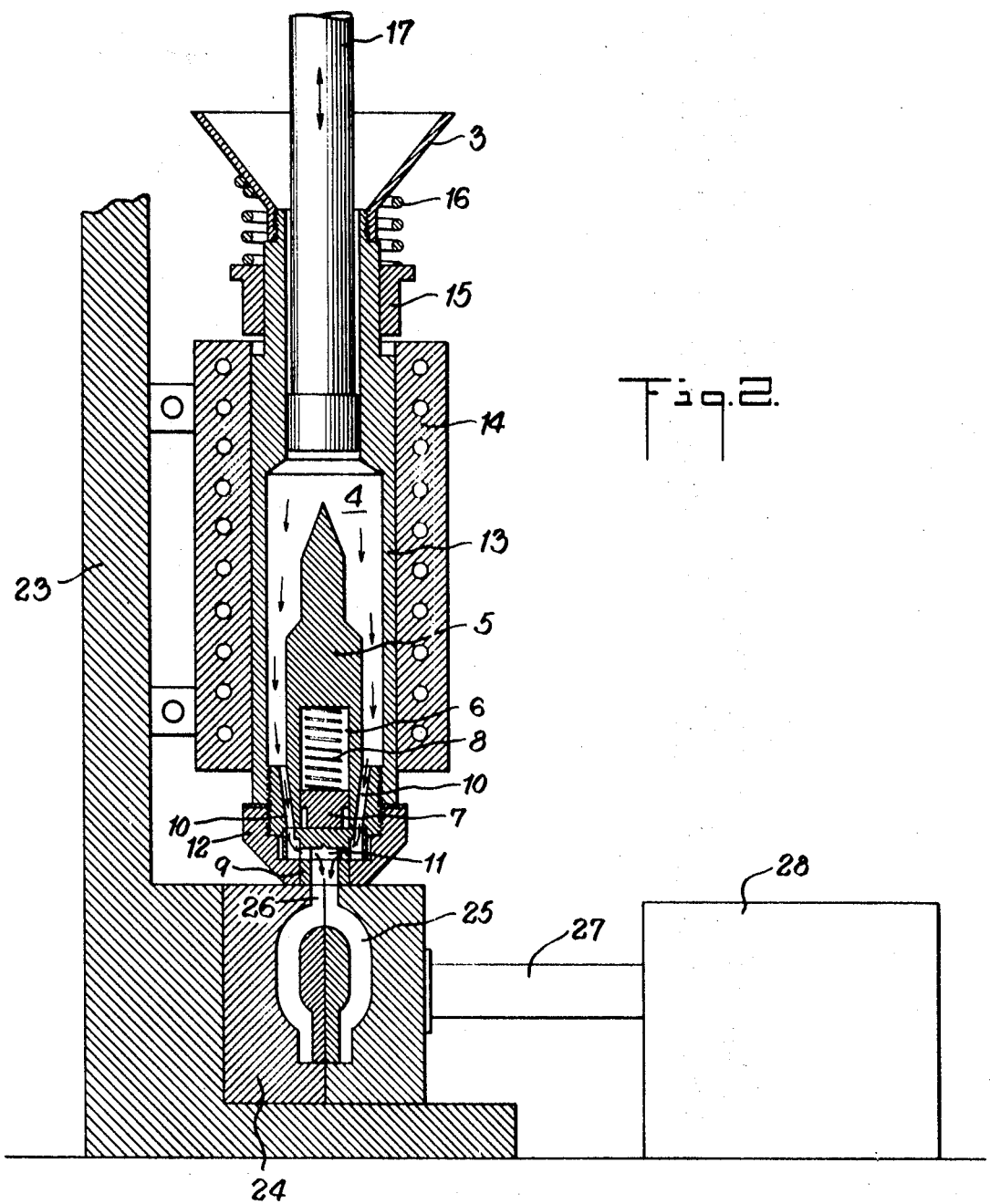
FIG. 2 is a side view of a portion of the injection press in use with a mold and clamping device.

A partial side view of the injector press is shown in FIG. 2 in which numerals which correspond to those in FIG. 1 indicate like parts. The injector press has a frame 23 which is attached to the heating chamber 14. The frame also supports a metal mold member 24 having a cavity 25 therein. The sprue 26 of the cavity is shown in communication with the passageways 11 of the nozzle valve 9 as the nozzle head 12 contacts the mold member. The passageways 11 likewise are in communication with passageways 10 which in turn communicate with the supply of wax in chamber 4.

An air-driven ram 27 in housing 28 maintains the two halves of the metal mold in close contact and prevents seepage of wax from the mold cavity.

The method by which wax castings may be made in accordance with the present invention is as follows. The starting materials may be any of a wide variety of commercially available molding waxes. These waxes may be of animal, vegetable, petroleum, or synthetic origin. For example, waxes such as beeswax and refined sugar cane waxes have been used for molding purposes as well as synthetic waxes. The preferred waxes normally have a melting point of around 145°–155° F. although higher or lower melting point waxes may be used in this invention. The wax, which is readily available in large blocks for use in the lost wax process, is first melted and poured into molds similar to ice cube trays which provide smaller wax blocks which are easily handled. The wax is then frozen by substantially reducing its temperature to any value which produces a brittle product, such as to 0°–32° F. The small blocks of wax are then brought to room temperature and ground to a fine powder. The grinding may be accomplished in any of a large number of commercially available units, or alternatively, the wax blocks may simply be crushed or chopped. The resulting wax powder should be a free-flowing product with particle sizes under one-fourth of an inch, and preferably under one-eighth of an inch diameter. The grinding of the wax is carried out only after it is frozen, since freezing imparts a relatively brittle structure. After the wax has been frozen, it may be brought to room temperature, up to about 75° F. This does not destroy its brittle structure and room temperature facilities drying of the wax or removing any condensed moisture therefrom. The grinding of a less brittle wax or a wax which has not been prefrozen leads to an agglomeration of the wax particles due to partial melting or softening during the grinding operation.

The powdered wax is then fed into the reservoir of FIG. 1 from which it freely flows down the chute, through the funnel and into the main wax chamber. Sufficient wax is used so that the wax chamber is substantially filled up to the funnel. The heating unit around the wax chamber is then activated and thermostatically set for about 125° F. when using a wax having a melting point of 145°–155° F. It is generally preferred to keep the temperature of the chamber from 10° to 35° F. below the melting point of the wax.

A mold is then positioned below the nozzle valve so that its sprue communicates with the outlet passageway of the nozzle valve. The metal mold, which is a two-part combination, is then secured in place. This is preferably accomplished with the air-driven ram shown in FIG. 2. A pressure of about 400 p.s.i., or from 300 to 500 p.s.i., has been found useful for maintaining the mold halves tightly together. Other types of securing mechanisms have often been found to allow wax seepage from the mold when subjected to the high pressure of the injection press.

When the thermostatic unit indicates that the wax has reached the desired temperature the ram mechanism is actuated by conventional switching means on the air pressure source. This actuation causes air to enter the air-chamber above the ram base and to steadily increase the pressure thereon. The ram is accordingly slowly moved into the wax chamber. The ram stroke is about 1 inch and the ram travels this distance in about 5 to 10 seconds, preferably 7 seconds. Approximately 1 second is consumed in free travel of the ram until it makes contact with the powdered wax. About one-half of the remaining cycle time is expended in maintaining the pressure on the wax after it has entered the mold cavity. The lowering of the ram causes the wax chamber to be depressed until the nozzle head contacts and firmly meets the metal mold. Simultaneously the nozzle valve is pushed upward upon contact with the mold so that the passageway therein communicates with the wax in the main wax chamber. The ram is continually lowered and drives the powdered wax into the mold cavity. A pressure of about 120 p.s.i. is built up above the ram base, although higher or lower pressures may be used, such as 75–150 p.s.i. This large pressure forces the wax into the mold cavity and to enter all of the crevices therein. The wax flows under this pressure and forms a composite mass.

The resultant wax casting is thus made at a significantly lower temperature than that used in conventional injecting molding of liquid wax. In addition the wax casting is denser than wax made from conventional injection of a liquid. Therefore, substantially less shrinkage or cavitation occurs, and the wax casting is free of imperfections and exhibits very fine detail. Furthermore, the use of the powdered wax and the slow ram movement prevents the trapping of air within the wax casting. Another advantage of this method is that the wax casting may be quickly, or immediately, removed from the metal mold, therefore providing for faster operation.

The process and apparatus of this invention is useful for a wide variety of cast wax objects where exactness of detail and rapid commercial applications are desired.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

I claim:
1. A method of making a wax casting which comprises,
freezing blocks of wax,
grinding the wax to a powder,
feeding the wax to an injection chamber which has a nozzle at its lower end and a ram positioned at its upper end,
heating said chamber to a temperature below the melting point of said wax,
clamping a mold cavity against said nozzle, and
slowly lowering said ram into said chamber to drive the wax into said mold cavity.

2. The process of claim 1 wherein said wax is brought to approximately room temperature and dried after said freezing and prior to said grinding.

3. The process of claim 1 in which said ram cycle is between 5 and 10 seconds.

4. The process of claim 1 in which a pressure of from 75 to 150 p.s.i. is applied to said ram.

5. The method of claim 1 wherein said lowering of the ram comprises,
applying pressure to said ram to slowly drive said wax into said mold cavity, and
retaining the pressure on said ram for a short period of time.